United States Patent [19]
Clarke et al.

[11] 3,809,904
[45] May 7, 1974

[54] METHOD FOR NON-DESTRUCTIVE DENSITOMETRIC MEASUREMENT OF SMALL VOLUMES INSIDE IRREGULARLY SHAPED NON-UNIFORM OBJECTS

[75] Inventors: Robert Lee Clarke; Gerk Gerry Van Dyk, both of Ottawa, Ontario, Canada

[73] Assignee: Atomic Energy of Canada Limited, Ottawa, Ontario, Canada

[22] Filed: Oct. 5, 1972

[21] Appl. No.: 295,097

[30] Foreign Application Priority Data
Nov. 24, 1971 Canada .............................. 128434

[52] U.S. Cl. ................ 250/358, 250/307, 250/312
[51] Int. Cl. .......................................... G01n 23/02
[58] Field of Search .......... 250/306, 307, 308, 312, 250/313, 358

[56] References Cited
UNITED STATES PATENTS
2,521,154  9/1950  Dudley .............................. 250/313
2,770,719  11/1956  Simjian ............................. 250/312

*Primary Examiner*—Archie R. Borchelt
*Attorney, Agent, or Firm*—Otto John Munz

[57] ABSTRACT

In determining the electron density of a small selected volume inside an irregularly shaped non-uniform body using radiographic techniques there has always been a dependence on the absorption of radiation in the medium surrounding the selected volume. The present invention allows the measurement of the electron density of a small volume within a non-homogeneous medium by manipulation of the apparatus. This manipulation removes the dependence of the measurement on the absorption of the X-ray or gamma-radiation in the surrounding medium.

6 Claims, 2 Drawing Figures

METHOD FOR NON-DESTRUCTIVE DENSITOMETRIC MEASUREMENT OF SMALL VOLUMES INSIDE IRREGULARLY SHAPED NON-UNIFORM OBJECTS

This invention relates to a non-destructive method of measuring the electron density of a selected small volume inside an irregularly shaped non-uniform object. The invention has particular, but not exclusive, use in determining the electron density of bones surrounded by tissue.

All known techniques for measuring the density of a volume within an object suffer from one or the other of two defects: either they are destructive, so that the object itself is altered, or when electromagnetic radiation, such as X-rays or gamma rays, is used, the density distribution of material surrounding the volume under consideration has to be known. This invention avoid both defects. It is non-destructive and inherently measures and takes account of the density distribution external to the test volume.

In the prior art it has been necessary to calculate or otherwise allow for the effects of absorption of radiation of the medium surrounding the selected volume whose electron density is to be measured. In the present invention this is done by measurement of photon flux density of both transmitted and scattered radiation. The technique involves the switching of sources and detectors so that in the final computation of electron density the dependence on absorption of the radiation is theoretically removed.

This invention uses the physical principles that the photon flux density of Compton scattering of high energy electromagnetic radiation in a volume is directly proportional to the electron density within the volume, according to the Klein-Nishina equation (O. Klein, Y. Nishina, Z. Physik 52 853 (1929)) and that the energy of the scattered photon is less than that of the incident photon by an amount which is a function of the angle of scattering (A.H.Compton and S.K. Allison: "X-rays in Theory and Experiment," D. Van Nostrand Co. Inc., New York (1935)). The application of this principle necessarily involves taking account of the absorption of the radiation while passing through the object going to, and coming from, the selected volume.

The invention will now be described for high energy radiations with reference to the accompanying drawings, in which.

Figure 1:
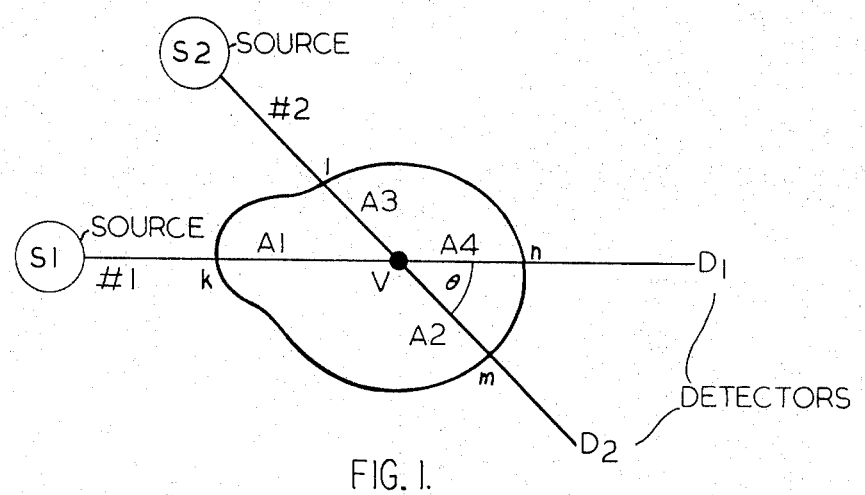
FIG. 1 is a diagram showing a test volume subjected to two finely collimated beams of electromagnetic radiation, the test volume is within an irregularly shaped non-uniform object.

Referring now to the drawings, two finely collimated beams, No. 1 and No. 2 of electromagnetic radiation, such as X-radiation or gamma radiation, i.e., photons, are obtained from two sources $S_1$ and $S_2$ which have average energies $E_1$ and $E_2$ respectively ($E_2 < E_1$). These beams are of the same size, and both pass through the test volume V (FIG. 1). From FIG. 1 let $A_1$ be the transmission of beam No. 1 from $k$ to V
$A_4$ be the transmission of beam No. 1 from V to $n$
$A_3$ be the transmission of beam No. 2 from $l$ to V
$A_2$ be the transmission of beam No. 2 from V to $m$
beam No. 1 have photon flux density $I_1$
beam No. 2 have photon flux density $I_2$
detector $D_1$ have geometric and intrinsic efficiency $d_1$
detector $D_2$ have geometric and intrinsic efficiency $d_2$
$\rho$ be the electron density of the scattering volume
G a combination of factors such that the scattering probability for photons to be scattered from beam No. 1 into beam No. 2 is $\rho G$ (See Klein-Nishina equation as given by equation 25 of Rev. Mod. Physics 24 79 (1952)).

The test volume V is determined by the region of intersection of beams No. 1 and No. 2. The angle $\theta$ between the two beams is—so chosen that Compton scattered radiation which reaches detector $D_2$ and which originated from beam No. 1 contains photons which after scattering at V, have an average energy which is equal to the average energy, $E_2$, of beam No. 2.

The transmission of the Compton-scattered radiation for the path from V to m is also $A_2$. The photon flux density, T, of the electromagnetic radiation measured by detector $D_1$ from beam No. 1, with beam No. 2 shut off, is $$T_1 = I_1 A_1 A_4 d_1$$

1(a)

and by detector No. 2 from beam No. 2, with beam No. 1 shut off, is:

$$T_2 = I_2 A_2 A_3 d_2$$

1(b)

where $d_1$ and $d_2$ represent the efficiencies of detectors $D_1$ and $D_2$ respectively. When beam No. 2 is shut off, detector $D_2$ measures the Compton scattered radiation which originates in beam No. 1. The photon flux density of this scattered radiation is:

$$s_1 = I_1 A_1 A_2 \rho G \, d_2$$

2(a)

Figure 2:
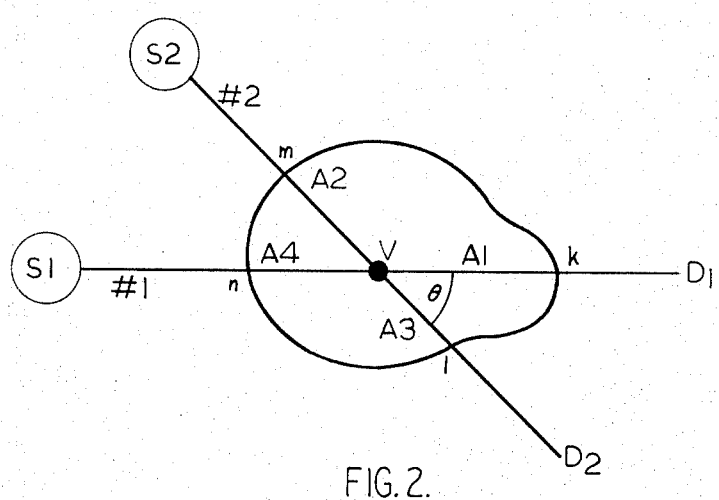
FIG. 2 is similar to FIG. 1, but the object is rotated by 180°.

Now, rotate the sample through 180° (see FIG. 2). The transmission of the Compton-scattered radiation from V to l is now $A_3$. At detector $D_2$ the photon flux density of the scattered radiation is:

$$s_2 = I_1 A_4 A_3 \, \rho G \, d_2$$

2(b)

The term $A_2$ appears in both Eqs. 1(b) and 2(a) because of the change (Compton shift) in beam No. 1 energy to that of beam No. 2, and because of the identical paths of Compton scattered beam No. 1 and transmitted beam No. 2. The same argument applies to the term $A_3$ in Eqs. 1(b) and 2(b).

One can now combine all the equations as follows:

$$T_1 T_2 / s_1 s_2 = I_2 d_1 / I_1 d_2 \cdot 1/\rho^2 G^2$$

(3)

Rearranging the terms gives the electron density $$\rho = 1/G \; \sqrt{s_1 s_2 / T_1 T_2 \cdot I_2 d_1 / I_1 d_2}$$

(4)

The unmeasured quantity, G, can be determined theoretically from the Klein-Nishina equation and the geometry of collimation of beams No. 1 and No. 2. The beam photon flux densities $I_1$ and $I_2$, and the detector efficiencies $d_1$ and $d_2$ can be determined using standard techniques. Equation (4) gives an absolute determination of the electron density $\rho$. Alternatively, the expression can be written as $$\rho = K_1 \sqrt{s_1 s_2 / T_1 T_2}$$

where $K_1$ is a constant for the apparatus. $K_1$ can be obtained by measurement of a sample of known electron density such as water. Values for $\rho$ for unknown samples are then determined relative to the known sample.

An alternative technique is to interchange the source of beam No. 1 and detector No. 1, and the source of beam No. 2 and detector No. 2 (see FIG. 2). It is envisaged that this may be done by fixing the sources and detectors together. The resulting assembly is then moved through 180° about the object.

We have used two gamma sources having differing energies such as Co-60 (average energy 1.25 MeV) and Cs-137 (energy 667 keV). The source strengths can be selected to suit the particular investigation provided there are photons of two discrete energies. X-ray sources may be used. The angle of scattering, $\theta$, was 50°, for which the energy of scattered Co-60 radiation is 663 keV.

The invention will not be described for use with low energy radiation. An example is Gd-153 (average energy about 0.1 MeV). When Gd-153 radiation is scattered through 45°, the secondary radiation has an energy of 0.095 MeV; this is very close to that of the original radiation. The two scattered radiation measurements can be obtained by two detectors in turn without rotating the sources and detectors or the sample.

Suppose now that in FIG. A.1 sources No. 1 and No. 2 are identical. The following set of equations is obtained with the source No. 1, as before:

$$T_1 = I_1 A_1 A_4 d_1 \quad (5a)$$

$$T_2 = I_1 A_3 A_2 d_2 \quad (5b)$$

$$s_1 = I_1 A_1 A_2 d_2 G \rho \quad (6a)$$

The second scattered reading is obtained using source No. 2, with detector $D_1$ $$s_2 = I_2 A_3 A_4 d_1 G \rho \quad (6b)$$

The term $A_2$ appears in both Eqns. (5b) and (6a) because there is negligible shift in energy on scattering, and the paths are identical. The same argument applies to the use of the term $A_3$ in Eqns. (5b) and (6b).

Combine the equations as before:

$$s_1 \cdot s_2 / T_1 \cdot T_2 = G^2 \rho^2 \quad (7)$$

Hence $$\rho = 1/G \sqrt{s_1 \cdot s_2 / T_1 \cdot T_2} \quad (8)$$

The unmeasured quantity G can be determined theoretically from the Klein-Nishina equation and the geometry of collimation of beams No. 1 and No. 2. Equation (8) then gives an absolute determination of the electron density $\rho$. Alternativey, G can be found from a set of readings obtained for a sample of known electron density such as water. The value of $\rho$ for unknown samples is given relative to that of the known.

To those skilled in the art, it is now obvious that either variant of the method can be used in a number of applications. For example, it is possible to determine bone mineral content without having to perform a biopsy and without having to account for interference from overlying soft tissue. Indeed, non-destructive static measurement of electron density of small volumes in any surrounding medium is now possible. A related application of the invention is the measurement of densities in a continuous flow of materials. This is accomplished by using additional sources of electromagnetic radiation and additional detectors instead of rotating the sample or interchanging the source of radiation and the detection apparatus.

We claim:

1. A method for measuring non-destructively the absolute electron density $\rho$ of a small selected volume of material surrounded by an irregularly shaped non-uniform body using high-energy electromagnetic radiation, said method comprising the steps:

i. directing a first finely collimated beam of photons of flux density $I_1$ from a first source of average energy $E_1$ through said volume and said body, said first source being located at a first source position, ii. Directing a second finely collimated beam of photons of flux density $I_2$ from a second source of average energy $E_2$ through said volume and said body, where $E_2$ is less than $E_1$ where said second source is located at a second source position, and the angle between the first and second beams is $\theta$, iii. adjusting the angle $\theta$ such that the Compton-scattered radiation measured at a second detector position, and which originated from said first beam, contains photons which after scattering at said volume, have an average energy which is eqaul to the average energy $E_2$ of said second beam, iv. measuring the photon flux density $T_1$ at first detector position co-axially aligned with, and on the opposite side of, the body to said first source, said second source being shut off, wherein the efficiency of detection is $d_1$, v. measuring the photon flux density $T_2$ at a second detector position co-axially aligned with, and on the opposite side of, the body to said second source, said first source being shut off, wherein the detection efficiency is $d_2$, vi. measuring the photon flux density $s_1$ originating from said first beam with second beam shut off vii. rotating said body 180° relative to both of said beams and detector positions and measuring the photon flux density $s_2$ originating from the first said beam with second beam shut off, and, viii. using the values of $s_1$, $s_2$, $I_1$, $I_2$, $T_1$, $T_2$, $d_1$ and $d_2$ to determine the value of the electron density $\rho$, which is given by the expression $$\rho = 1/G \sqrt{s_1 s_2 I_2 d_1 / T_1 T_2 I_1 d_2}$$

where $G$ is determined from the Klein-Nishina equation and the geometry of collimation of beams No. 1 and No. 2.

2. A method according to claim 1 wherein the electron density relative to a known substance may be found according to $$\rho = K_1 \sqrt{s_1 s_2 / T_1 T_2}$$

$K_1$ is a constant of the apparatus, determined from measurement of a standard sample.

3. A method for measuring non-destructively the absolute electron density of a small selected volume of material surrounded by an irregularly shaped non-uniform body, using low-energy electromagnetic radiation, said method comprising these steps:

i. directing first and second equally and finely collimated beams of photons from first and second sources of equal, average energy through said volume and said body, ii. adjust angle $\theta$ so that a suitable test volume is defined by the intersection beams No. 1 and No. 2 and so that the energy shift between primary and scattered beam is reasonably small, iii. measuring the photon flux density $T_1$ at a first detector position co-axially aligned with, and on the opposite side of, the body to said first source, with said second source shut off, iv. measuring the photon flux density $T_2$ at a second detector position co-axially aligned with, and on the opposite side of, the body to said second source, with said first source shut off, v. measuring a first scattered radiation $S_1$ from the said first source at said second detector porition, with said second source shut off, vi. measuring a second scattered radiation $s_2$ from said second source, at said first detector position, with said first source shut off, and vii. using the values of $s_1$, $s_2$, $T_1$ and $T_2$ to determine the value of the absolute electron density $\rho$, where $\rho = 1/G \sqrt{s_1 s_2 / T_1 T_2}$ where $G$ is determined from the Klein-Nishina equation and the geometry of collimation of beams No. 1 and No. 2.

4. A method according to claim 3, wherein the electron density, $\rho$, relative to a known substance may be found according to the expression $$\rho = 1/G \sqrt{s_1 s_2 / T_1 T_2}$$

where the constant, $G$, of the apparatus is determined from measurement of a standard sample.

5. A method according to claim 3, wherein a single source, moved alternately from the position of the said first source to the position of the said second source, and back, may be used in place of the two sources.

6. A method, according to claim 3, wherein a single detector, moved alternately from the position of the said first detector to the position of the said second detector, and back, may be used in place of two detectors.

* * * * *